Jan. 11, 1927.
O. C. MEYER
1,614,432
AUXILIARY MACHINING ATTACHMENT FOR LATHES
Filed Feb. 2, 1925   4 Sheets-Sheet 1
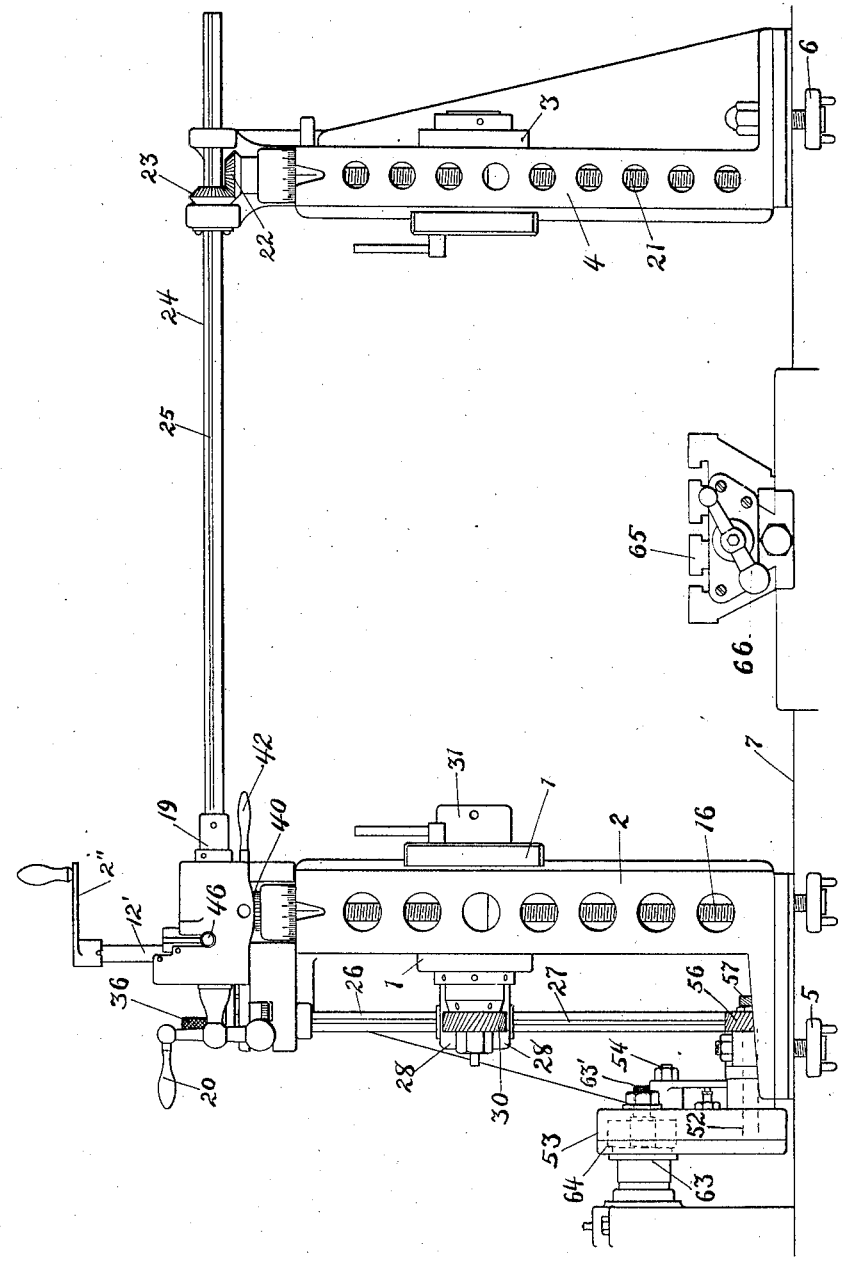
INVENTOR
Otto C. Meyer
BY
A. G. Burns ATTORNEY

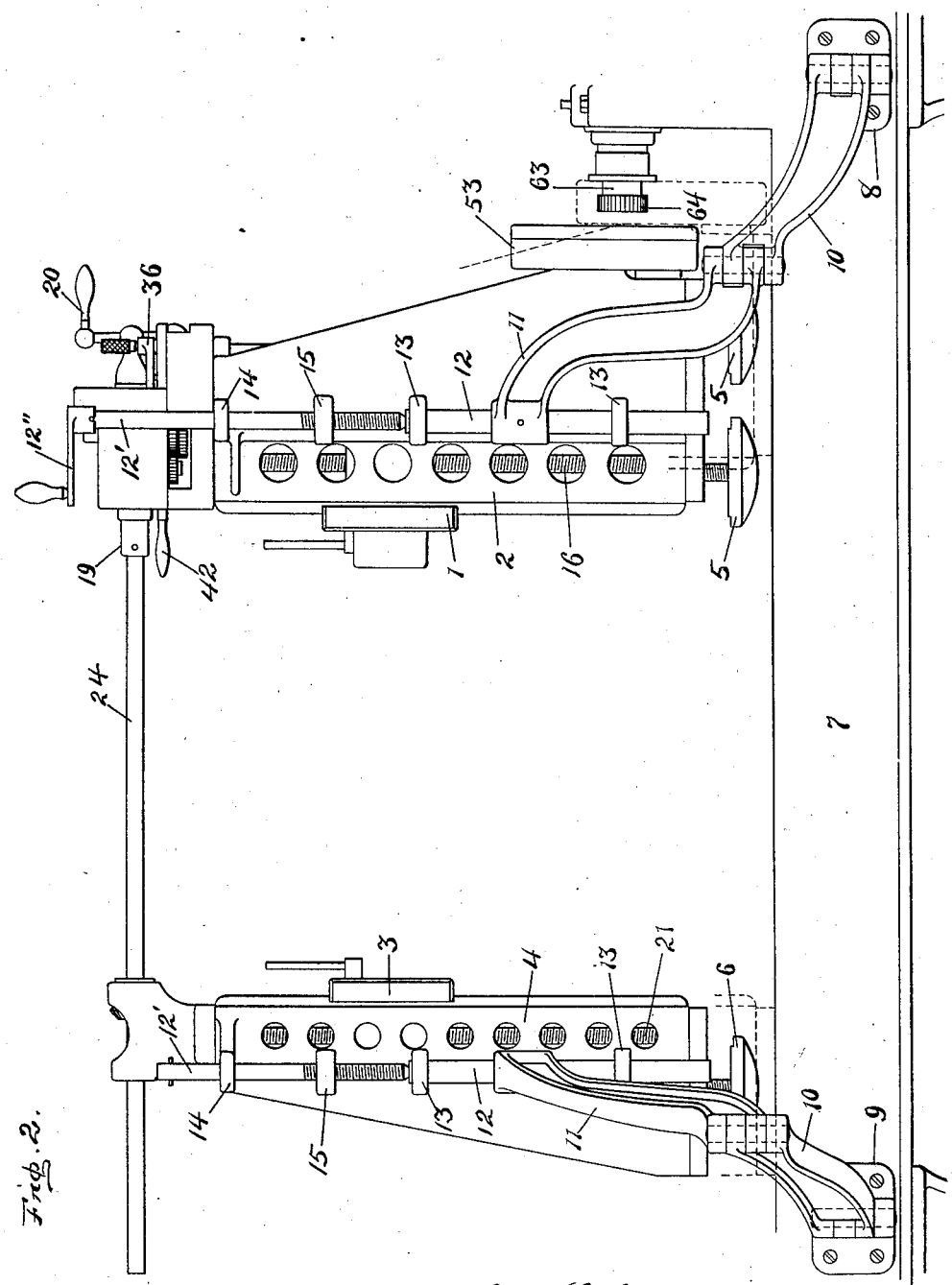

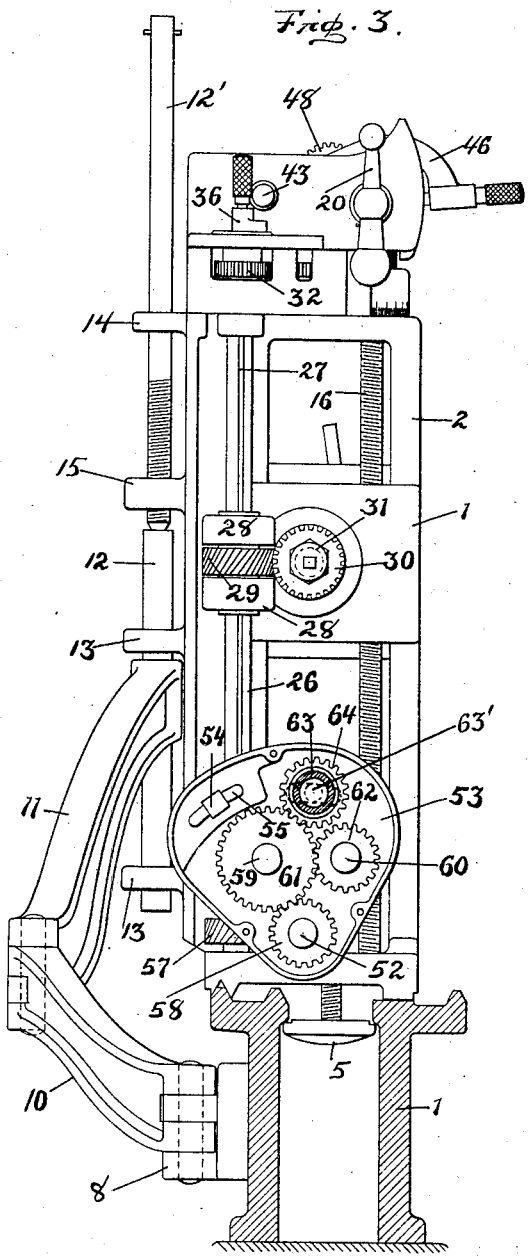

Jan. 11, 1927.
O. C. MEYER
1,614,432
AUXILIARY MACHINING ATTACHMENT FOR LATHES
Filed Feb. 2, 1925 4 Sheets-Sheet 4
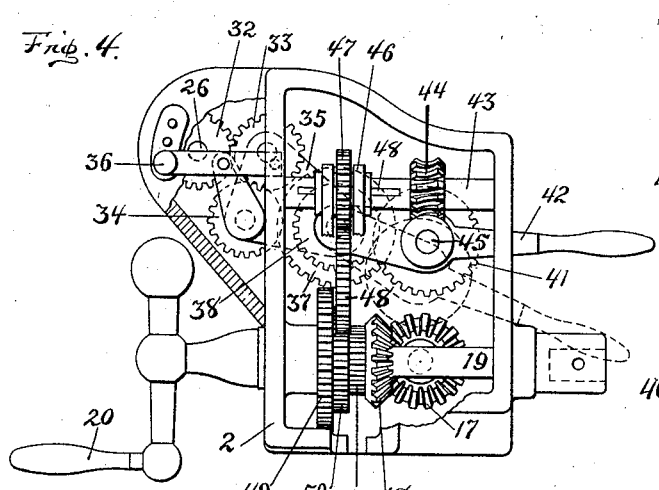
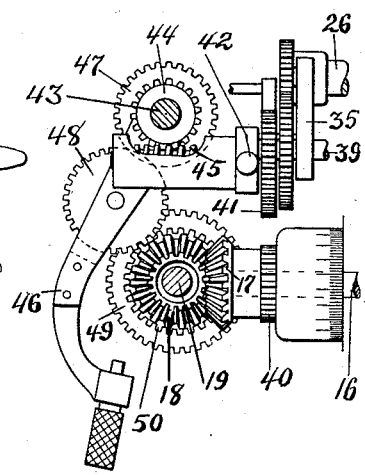
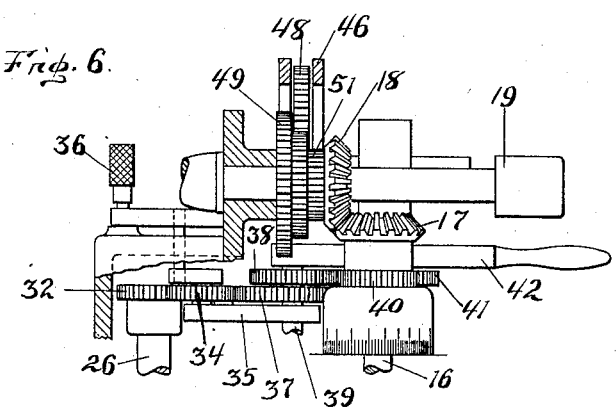
Otto C. Meyer INVENTOR
BY
A. G. Burns ATTORNEY Patented Jan. 11, 1927.

1,614,432

UNITED STATES PATENT OFFICE.

OTTO C. MEYER, OF FORT WAYNE, INDIANA, ASSIGNOR OF ONE-HALF TO FRED C. MEYER, OF STURGIS, MICHIGAN.

AUXILIARY MACHINING ATTACHMENT FOR LATHES.

Application filed February 2, 1925. Serial No. 6,208.

This invention relates to improvements in auxiliary machining attachments for lathes of that general character set forth in Letters Patent No. 1,497,113, issued to me June 10, 1924, and the objects of the improvements are: First, to provide a compact power transmission between the live spindle of the lathe and the adjustable live spindle of the auxiliary head; second, to provide a compact variable speed and reversing mechanism in connection with said transmission for actuating the auxiliary head and tail blocks; third, to provide in connection with the lathe a means for elevating the auxiliary attachment and sustaining it in a position clear of the lathe bed to admit of free operation of the lathe independently of the attachment; and fourth, to so construct the power transmission and arrange it in connection with the auxiliary head, standard as will admit of its being readily disconnected from and re-connected with the live spindle of the lathe, and the unobstructed removal of the head standard with the power transmission from the lathe bed.

These objects are accomplished by the construction illustrated in the accompanying drawings, in which:—

Fig. 1 is a front elevation of a construction embodying the invention mounted upon a lathe;

Fig. 2 is a rear elevation of the attachment shown sustained in elevated position in connection with the lathe bed;

Fig. 3 is a front end elevation of the auxiliary head standard in operating position on the lathe bed, the lathe bed being in section, and the view being upon a slightly increased scale relative to Figs. 1 and 2;

Fig. 4 is a plan view of the auxiliary head standard and its contained gearing, a portion thereof being broken away;

Fig. 5 is an elevation of the speed change and reverse gear mechanism projected from Fig. 4; and Fig. 6 is a similar view projected from Fig. 4 at a right angle from that of Fig. 5.

The characters appearing in the description refer to parts shown in the drawings and designated thereon by corresponding characters.

The invention includes a head block 1 mounted in a vertically disposed head standard 2, and a tail block 3 mounted in a vertically disposed tail standard 4, each of said blocks being vertically movable in their respective standards, there being provided suitable clamps 5—6 for securing the standards respectively in operating position upon the lathe bed 7 in adjustably spaced relation with each other.

On the back of the lathe bed 7 are fixed a pair of brackets 8—9, in each of which is hinged an arm 10 disposed to swing upon a vertical axis, and at the outer end of each arm is hinged a secondary arm 11 also disposed to swing upon a vertical axis. Each of said arms has fixed in its outer end a vertically disposed shaft 12 that extends loosely through a pair of lugs 13 on the back of the corresponding standards 2—4 so that each standard may be turned and moved vertically relative to the shaft while being sustained thereon in vertical position. Each standard has also on its back a second pair of lugs 14 and 15 alined with the lugs 13 thereon, and a jack-screw 12' is mounted in said lugs in alinement with the corresponding shaft 12 and bears upon the top thereof, said jack-screw having threaded relation with the lug 15 so that the standard may be raised or lowered on the shaft 12 accordingly as the jack-screw is turned. A detachable handle 12", applicable to either jack-screw is provided for actuating them.

In the head standard 2 is mounted a vertically disposed feed-screw 16 having actuating relation with the head block 1 operable to move the head block vertically on the standard accordingly as the screw is turned, and on the top of the screw-shaft is fixed a pinion 17 that meshes with a companion pinion 18 on an operating shaft 19 which is horizontally disposed and revolubly movable in the standard 2, there being a handle 20 on the operating shaft for actuating it. In the tail standard 4 is mounted a vertically disposed feed-screw 21 having actuating relation with the tail-block 3 operable to move the tail-block vertically on the standard accordingly as the feed screw is turned, and on the top of the feed screw is fixed a pinion 22 that meshes with a companion pinion 23 on a revoluble shaft 24 which is mounted and longitudinally movable in the standard 4, the shaft 24 being detachably connected with the operating shaft 19 in the head standard. The shaft 24 is longitudinally movable in the pinion 23, and the pinion has engaging relation with a longitudinal key-way 25 in said shaft so as to be rotatably driven thereby. Thus, by turning the handle 20 the feed-screws 16 and 21 may be simultaneously turned and the head-block 1 and tail-block 3 raised or lowered accordingly as the shaft 19 is actuated.

In the head standard 2 is rotatably mounted a vertically disposed drive-shaft 26 having a longitudinal key-way 27 therein, which shaft extends loosely through a pair of spaced lugs 28 on the head block 1, and upon the drive-shaft between said lugs is mounted a spiral driving gear 29 which has engagement with the key-way 27 so as to be rotated by the drive-shaft and so as to be moved longitudinally thereon as the head-block is raised or lowered. The gear 29 has driving relation with a companion spiral gear 30 fixed on the rear end of the auxiliary live spindle 31 so that as the drive-shaft revolves the spindle will accordingly be actuated.

A speed changing and reverse gearing is provided in the upper part in the auxiliary standard 2 for imparting movement from the drive-shaft 26 to the operating shaft 19, and consists of a gear 32 fixed on the upper end of the drive-shaft 26 that is engaged selectively by a pair of gears 33 and 34 which mesh constantly with each other and are mounted upon a swinging block 35. The block is adjustably shifted by a lever mechanism 36 having connection therewith, so that the gears 33 and 34 may be selectively brought into mesh with the gear 32. The gear 34 meshes constantly with a gear 37 that has fixed relation with a concentric gear 38, said gears 37 and 38 being mounted upon a stud 39 that also serves as the pivotal bearing for the block 35. The feed-screw 16 has fixed thereon a pinion 40 that is engageable by a gear 41 which is mounted upon a shift lever 42 and which constantly meshes with the gear 38 previously referred to, the shift lever having pivotal bearing on the stud 39, so that movement may be imparted from the drive-shaft 26 to the feed-screw 16.

A countershaft 43 is horizontally disposed in the standard 2 and has a worm-gear 44 fixed thereon that is engageable by a worm 45 which has fixed relation with and is rotated by the gear 41 on the shift-lever 42. The worm is brought into driving relation with the worm-gear 44, or the gear 41 is drawn into mesh with the gear 40 on the feed-screw selectively as the shift-lever 42 is positioned. A bifurcated lever 46 is loosely mounted upon the countershaft 43 and is longitudinally movable thereon, and a gear 47 in the lever and longitudinally movable on the countershaft has engagement with a key-way 48 therein so as to be rotated with the shaft. Also, the lever 46 has mounted therein an intermediate gear 48 that meshes constantly with the gear 47 and is selectively engageable with a series of gears 49, 50 and 51 that are fixed on the operating shaft 19, accordingly as the lever 46 is manipulated. The gears 49, 50 and 51 vary in diameter, so that movement is imparted from the countershaft to the operating shaft with a velocity ratio varied accordingly as the gears are selectively engaged by the manipulation of the lever 46. Thus, the feed-screw may be actuated directly through the reversible gearing, or through the speed change gearing, selectively accordingly as the shift lever 42 is positioned.

In the front end of the base of the standard 2 is mounted a rotatable shaft 52 upon which is pivotally supported a gear housing 53, there being a bolt 54 that extends through a slot 55 in said housing and in connection with the standard for securing the housing adjustably in position. On the rear end of the shaft 52 is fixed a spiral gear 56 that has driving relation with a companion gear 57 that is fixed on the drive-shaft 26; and upon the opposite end of the shaft 52 is fixed a pinion 58. In the housing 53 is mounted upon corresponding studs 59 and 60 a pair of meshing intermediate gears 61 and 62, the former having constant meshing engagement with the gear 58, and upon the live spindle 63 of the lathe is fixed a drive pinion 64 that is engageable selectively by the intermediate gears 61 and 62 accordingly as the housing 53 is adjustably positioned. Thus motion is imparted to the drive-shaft 26 from the live spindle of the lathe selectively in opposite directions. A stud 63' adjustably secured in the housing extends into the bore of the gear 64 and affords a bearing therefor.

Upon the lathe bed 7 is a movable carriage 65 of any suitable construction for mounting objects to be machined, the carriage being similar to those used in ordinary practice that are moved longitudinally on the bed by the feed mechanism of the lathe (not shown) and also transversely by a feed mechanism 66. The object to be machined is clamped on the carriage 65 so that it may be moved with the carriage to various locations between the head and tail standards.

In the operation of the invention a suitable tool, such as an arbor having thereon a cutting instrument (not shown), is mounted in the live spindle 31 and in the tail-block 3, so that as the spindle is actuated the tool is rotated accordingly, while the object to be machined is clamped onto the carriage and moved into contact with the cutting instrument. The lathe spindle 63 is rotated as in the ordinary operation of the lathe and motion therefrom is imparted to the drive-shaft 26 through the medium of the gears 64, 61, 58, 56 and 57, or, in the reversed direction through the additional gear 62 which may be interposed between the gears 64 and 61 by adjustably positioning the housing 53. Motion is imparted from the drive-shaft 26 to the auxiliary live spindle 31 through the medium of the gears 29 and 30. In this manner such a tool, as may be fixed in connection with the spindle 31 is actuated. The operator, through manipulation with the carriage may bring the object thereon into contact with the revolving tool, and by manipulating the controls for the various gearing previously described, may elevate and lower the tool as may be desired to properly apply the tool to the object. Likewise by adjusting the controls for the gearing the head and tail blocks may be automatically raised and lowered through operation of the feed screws 16 and 21.

When use of the lathe is desired independently of the auxiliary machining attachment, the extension 24 is disconnected from the operating shaft 19, and the clamps 5—5 and 6 on the respective standards are released from the lathe bed. The head standard is then slid bodily on the bed rearwardly to disengage the drive pinion 64 on the lathe spindle from the gears in the housing 53, and both head and tail standards may then be raised above the bed by manipulating the jack screws 12' and swung upon their respective jointed brackets out of the way of interfering with ordinary operations performed upon the lathe.

What I claim is:—

1. In a combination with a turning lathe, a vertically disposed head standard; a vertically disposed tail standard, each of said standards being supported on the lathe-bed and longitudinally movable thereon; a jointed bracket member for each of said standards, each of said members having hinged support on the lathe bed and said standards having hinged connection respectively with said members and being vertically movable thereon; and a vertically disposed jack-screw on each standard bearing upon the corresponding bracket member and operable to elevate the standard relative to its bracket member.

2. In a machining attachment for a turning lathe, a vertically disposed head standard supported on the lathe bed; a jointed bracket member having hinged support on the lathe-bed, said standard having hinged connection with said member and being vertically movable thereon; and a jack-screw on the standard bearing upon the bracket member and operable to elevate the standard relative to said member; a feed mechanism for actuating the head-block; a rotatable spindle in the head-block including a gear thereon; a drive-shaft in the head standard; a driving gear movable with the head block and rotatably actuated by the drive-shaft and having actuating relation with the spindle gear; a gearing having actuating relation with said feed mechanism driven by the drive-shaft; and a gearing in connection with the lathe spindle having actuating relation with said drive-shaft.

3. In a machining attachment for a turning lathe, an auxiliary head member removably mounted on the lathe-bed and having a vertically movable head-block therein; an auxiliary tail member movably supported on the lathe-bed and having a vertically movable tail block therein; a rotatable spindle in said head block; a mechanism detachably connected with the lathe spindle having actuating relation with the movable blocks in said head and tail members and with said rotatable spindle; a jointed bracket member for said head and tail members respectively, each bracket member having hinged support on the lathe-bed, said head and tail members each having sliding connection with the corresponding bracket member; and means in connection with said head and tail members for elevating said members respectively on the corresponding bracket members, said bracket members being operable to sustain the head and tail members in positions out of range of normal operations on the lathe when disconnected from operative relation therewith.

4. In a machining attachment for a turning lathe, a spindle supporting member including a drive-shaft having actuating relation with said spindle; a gearing on the supporting member having detachable connection with the lathe spindle and actuating relation with the drive-shaft; a jointed supporting means on the lathe bed and upon which the spindle supporting member has vertical sliding movement; and means for adjusting the spindle supporting member on the jointed supporting means when said gearing is disconnected from the lathe spindle.

5. In a machining attachment for a turning lathe having a bed and lathe spindle, an auxiliary spindle supporting member including a spindle therein, a jointed bracket having hinged support on the lathe bed and hinged connection with the auxiliary member; a gearing detachably connected with the lathe spindle having operable relation with the spindle in the auxiliary member; and means for elevating the auxiliary member on the bracket, said bracket admitting of movement of the auxiliary member endwise upon the lathe-bed to effect disconnection of said gearing from the lathe spindle and lateral movement respecting the lathe bed when said gearing is disconnected and the auxiliary member is elevated on said bracket.

6. In a machining attachment for a lathe, an auxiliary member positioned on the lathe bed including a vertically movable head block; an auxiliary spindle in the head block including a gear thereon; a feed mechanism for actuating the head block; a rotatable drive shaft having actuated relation with the lathe spindle; a driving gear rotated by the drive shaft and having sliding movement longitudinally thereon; a speed change gearing having actuating relation with said feed mechanism; and a reversible gearing actuated by the drive shaft including means for throwing said reverse gearing selectively into engagement with said speed change gearing and feed mechanism.

7. In mechanism of the class described, a head standard having therein a movable head block; a rotatable spindle in the head block; a drive shaft having actuating relation with said spindle; a feed mechanism for actuating the head block; a speed change gearing having actuating relation with said feed mechanism; and a reversible gearing actuated by the drive shaft including means for throwing the reversible gearing into actuating engagement selectively with said speed change gearing and feed mechanism.

8. In a machining attachment for a turning lathe having a bed and lathe spindle, a head standard mounted upon the lathe bed; a movable head block in the standard having an auxiliary spindle therein; a feed mechanism for actuating the head block; a drive shaft having actuating relation with the auxiliary spindle and said feed mechanism; a gear housing adjustably supported upon the standard; and a reverse gear mechanism in said housing having actuating relation with the drive shaft and being engageable with the lathe spindle so as to be driven selectively in opposite directions accordingly as the housing is positioned.

9. In apparatus of the class described, a head standard having a movable head block therein; a rotatable spindle in the head block; a feed mechanism for actuating the head block; a speed change gearing having actuating relation with said feed mechanism; a drive shaft having actuating relation with the spindle; and an intermediate gearing actuated by the drive-shaft and including means for throwing the intermediate gearing into operative engagement selectively with said speed change gearing and said feed mechanism.

10. In a machining attachment for a lathe having a bed and lathe spindle, a head member having a movable head block therein; an auxiliary spindle in said head block; a drive-shaft for the auxiliary spindle; a reversible gearing driven by the lathe spindle and actuating the drive shaft; a feed mechanism for said head block; and a second reversible gearing actuated by the drive shaft and having operable engagement with the feed mechanism.

In testimony whereof I affix my signature.

OTTO C. MEYER.